United States Patent [19]

Bernsen et al.

[11] Patent Number: 5,293,433
[45] Date of Patent: Mar. 8, 1994

[54] METHOD AND DEVICE FOR DETECTING PATTERNS ADAPTED AUTOMATICALLY FOR THE LEVEL OF NOISE

[75] Inventors: Johannes A. C. Bernsen, Eindhoven, Netherlands; Seiji Kashioka, Tokyo, Japan

[73] Assignees: U.S. Philips Corporation, New York, N.Y.; Hitachi, Ltd., Tokyo, Japan

[21] Appl. No.: 981,969

[22] Filed: Nov. 25, 1992

Related U.S. Application Data

[62] Division of Ser. No. 677,705, Mar. 29, 1991, Pat. No. 5,193,127.

[30] Foreign Application Priority Data

Mar. 30, 1990 [JP] Japan .................................. 2-80745

[51] Int. Cl.⁵ .............................................. G06K 9/40
[52] U.S. Cl. ..................................... 382/54; 358/463; 358/464; 382/48; 382/50
[58] Field of Search ........................ 382/32, 54, 48, 22, 382/50, 56; 358/447, 448, 463, 464, 465; H04N 1/36, 1/40

[56] References Cited

U.S. PATENT DOCUMENTS

| | | | |
|---|---|---|---|
| 5,018,218 | 5/1991 | Peregrim et al. | 382/22 |
| 5,050,223 | 9/1991 | Sumi | 382/54 |
| 5,050,227 | 9/1991 | Furusawa et al. | 382/54 |
| 5,068,908 | 11/1991 | Inoue et al. | 382/48 |
| 5,103,484 | 4/1992 | Stafford et al. | 382/22 |
| 5,111,285 | 5/1992 | Fujita et al. | 382/22 |
| 5,140,646 | 8/1992 | Ueda | 382/22 |

OTHER PUBLICATIONS

R. M. Haralick, "Digital Step Edges From Zero Crossing of Second Directional Derivatives", IEEE Transactions on Pattern Analysis and Machine Intelligence, vol. PAMI-6, No. 1, Jan. 1984, pp. 58–68.

J. Canny, "A Computational Approach to Edge Detection", IEEE Transactions on Pattern Analysis and Machine Intelligence, vol. PAMI-8, No. 6, Nov. 1986, pp. 679–698.

*Primary Examiner*—Joseph Mancuso
*Attorney, Agent, or Firm*—Anne E. Barschall

[57] ABSTRACT

In detecting patterns in data arranged in a spatial field of one, two or higher dimension, a pattern contrast signal is evaluated which measures the similarity to the pattern of the data around a location in the spatial field. The pattern is subsequently detected if the pattern contrast signal is sufficiently strong. There is, however, a risk of erroneous detection when a coincidental noise configuration causes an increased pattern contrast signal. The invention provides for a method and apparatus to discriminate against such erroneous detections. For this purpose, the method observes the extent to which a would-be pattern dominates the effect on the pattern contrast signal of the distribution of data values in the surroundings of the location, this distribution being taken to be typical of noise. In one embodiment, this is done by confirming that the pattern is sufficiently strong to suppress any other would-be pattern detections in the surroundings. In another embodiment, this is done by confirming that the pattern contrast signal responds as expected in the noise free case when the spatial field is rescaled around the location before evaluating the pattern contrast signal.

5 Claims, 6 Drawing Sheets

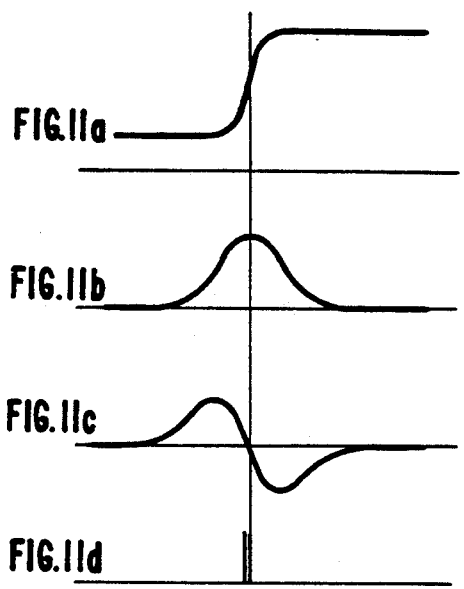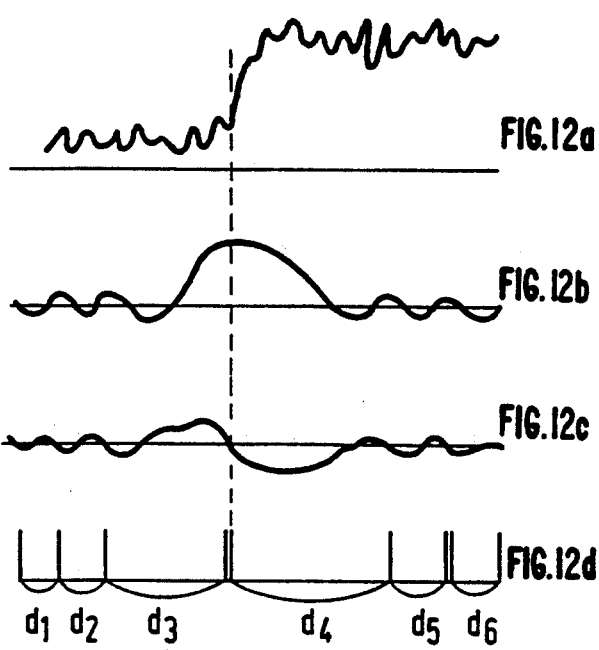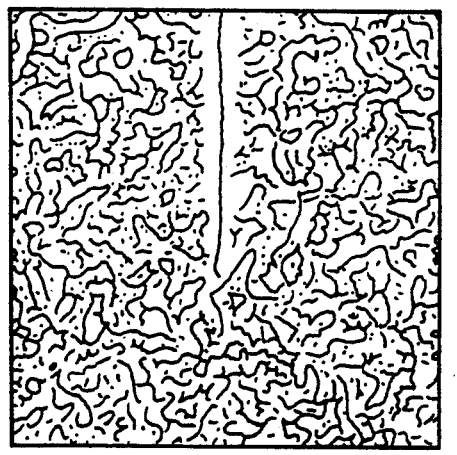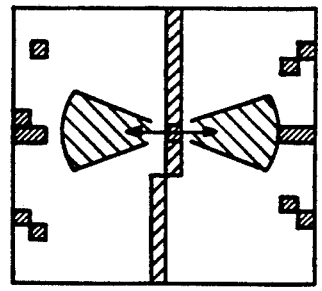
FIG.13  FIG.14

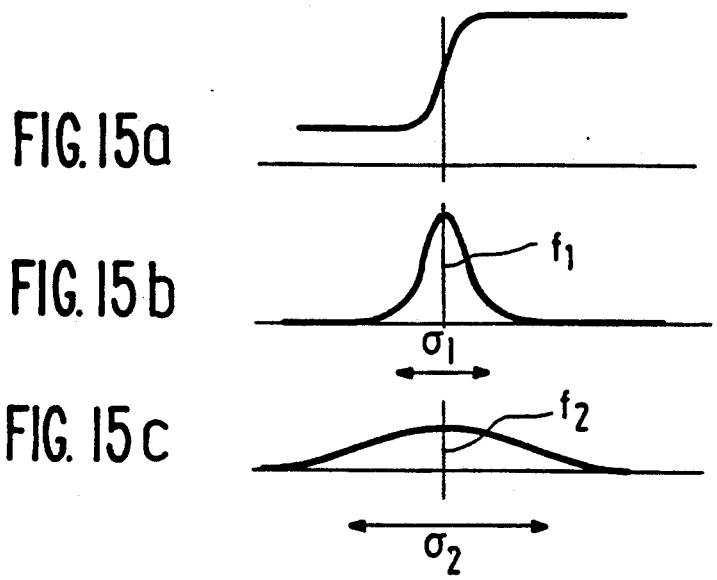
FIG. 15a
FIG. 15b
FIG. 15c
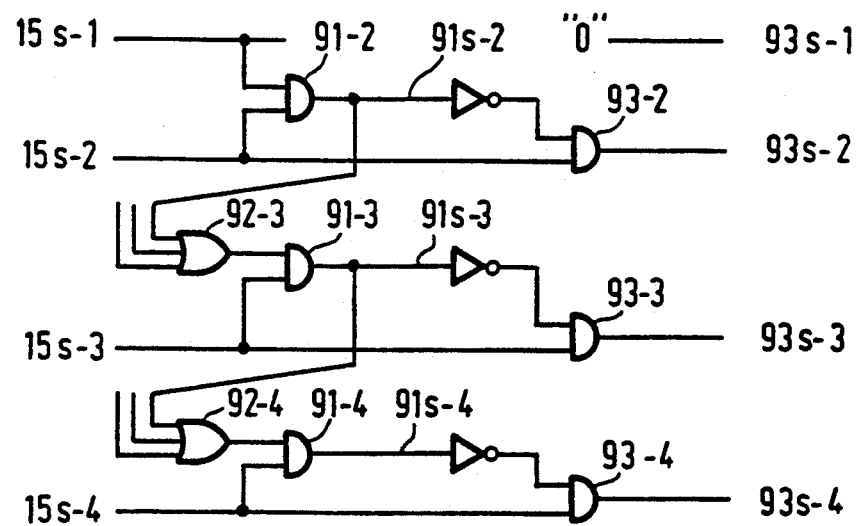
FIG. 16

METHOD AND DEVICE FOR DETECTING PATTERNS ADAPTED AUTOMATICALLY FOR THE LEVEL OF NOISE

This is a division of U.S. application Ser. No. 07/677,705, filed on Mar. 29, 1991 now U.S. Pat. No. 5,193,127.

BACKGROUND OF THE INVENTION

Field of the Invention

The present invention relates to a method and device for distinguishing patterns and, more particularly, to a pattern detection system such as a signal processing or signal analysis system for distinguishing true pattern responses from noise pattern responses. Typical patterns are edges in images. The present invention can be applied, for example, to the field of medical image analysis or to the field of robot vision.

Related Art

In order to distinguish true pattern responses from noise pattern responses in the output of a pattern detection system, the prior art usually thresholds the pattern contrast output of the pattern detection system, assuming that the noise level is known in any place of the input signal (see, for example, R. M. Haralick, "Digital Step Edges from Zero Crossing of Second Directional Derivatives", IEEE Transactions on Pattern Analysis and Machine Intelligence, Vol. PAMI-6, No. 1, 1984, pp. 58–68).

Alternatively, for a simple global noise estimation technique (see J. Canny, "A Computational Approach to Edge Detection", IEEE Transactions on Pattern Analysis and Machine Intelligence, Vol. PAMI-8, No. 6, 1986, pp. 679–698.

Especially if the known noise assumption is not valid, the selection of this pattern contrast threshold is difficult and is usually done manually by an operator. This manual selection sometimes needs to be done for every new input signal.

SUMMARY OF THE INVENTION

An object of the present invention is to provide a method and a device to distinguish true pattern responses in the output of a pattern detection system automatically from noise pattern responses.

By "true pattern", we mean a pattern which is actually present in a signal and which has a signal to noise ratio sufficient for detecting it. By "true pattern responses," we mean the response to a true pattern.

In order to attain this object, according to the present invention, there are provided a pattern detection method and device using a selection method which relies on the difference in response, that pattern detectors exhibit, between true patterns and noise. Various embodiments of this method may be used separately or combined with each other or combined with any other response selection method.

The pattern detection of the present invention using the response distance selection method is based upon the fact that in the area adjacent to a true pattern, much less response due to noise will be present than in the situation when only noise is present.

This will be described in case of one dimension with reference to FIG. 11. FIG. 11(a) shows a noiseless edge signal. This edge signal is reformed to have a peak at its edge position, as shown in FIG. 11(b), if it is subjected to a linear differentiation by an edge extraction filter having a certain extension. This reformed signal is then subjected to a second differentiation to have a shape shown in FIG. 11(c). This twice differentiated signal has an intersection with the zero point, as shown in FIG. 11(d), which gives the inflection point of the original signal (a). This inflection point may be considered to locate the edge position. Without any noise, no problem would arise in locating the edge and its position.

With noise superposed, however, the signals have their shapes changed, as shown in FIGS. 12(a) to 12(d). An absolute value of the signal of FIG. 12(b) which is taken and thresholded according to the representative method of the prior art. If the threshold level is properly set in this example, the true edge could seem to be extracted. However, it is difficult to select an effective threshold value when the S/N ratio deteriorates, namely, when either the signal is reduced on the noise will be increased. However, no other edge is detected in the neighborhood of the true edge, as can be seen by observing the edge distribution of FIG. 12(d). The true edge seems to expel any false edge due to noise. Specifically, the first feature of the present invention is to discriminate the truth and falsity depending upon the distance d between the edges, as shown in FIG. 12(d). In the example of FIG. 12(d), both the distances d3 and d4 at the two sides of the true edge are large. In the false edge, at least one distance is small.

The result of similar processing with a two-dimensional artificial image is shown in FIG. 13. As shown, the image before processing has a vertical edge at the centre, and noise is superposed all over the frame. The noise is smaller in the upper portion of the frame and larger in the lower portion. As a result, the S/N ratio is 1 or less in the lower frame portion so that the true edge is not detected. However, the true edge is detected in the upper half wherein the S/N ratio is 1 or more, and no false edge due to the noise appears in the neighborhood of the edge.

From these observations, a first embodiment of the pattern detection method present invention is introduced. Specifically, if a candidate of the edge is present, its neighborhood is examined, and it is decided to be the true edge unless another edge is present. In two or more dimensions, however, the edge is not independent but coupled so that an edge is present in its own neighborhood. As shown in FIG. 14, therefore, it is advisable to examine whether or not another edge is present in the sectors having extensions in the direction perpendicular to the edge direction.

The second pattern detection method of the present invention uses the ratio of the outputs of two pattern detectors having different sizes. A second embodiment of the pattern detection method of the present invention makes use of the fact that the ratio is concentrated within a certain range for the true pattern response but mostly lies outside this range in case of noise patterns.

This will be described with reference to FIG. 15. FIGS. 15(a) and 15(b), which show, like FIG. 11, an original signal and the output signal of the edge extraction operator receiving the original signal. Here, the first edge extraction operator has an output width $\sigma 1$, and the second operator has a greater output width to $\sigma 2$, which is shown as gentler less steeply peaked in FIG. 1(c) than in FIG. 15(b). If the peak values f1 and f2 are attenuated, if compared, at a certain ratio.

As a result, an edge can be located by determining the ratio of the outputs of two kinds of edge extraction operators having different input window widths and by deciding whether or not the ratio is within a certain range. This method is the second embodiment of the pattern detection method of the present invention.

The first and second embodiments of the pattern detection methods according to the present invention are independent of each other and can be combined.

Neither the first nor second pattern detections (of edges) according to the present invention rely upon the noise level, the absolute value of the edge signal or the number of true edges. Thus, the two detections are similarly advantageous in that only the responses to the true (edge) signal can be recognized and extracted even if the absolute value of the noise in the video signals is unknown and different for the places.

Here, with the signal, we mean one, two or more dimensional signals. In case of the one dimensional signal, the meaning of the dimension is slightly restricted so that the step to be used for the direction is accordingly simplified.

BRIEF DESCRIPTION OF THE DRAWING

The present invention will be described in detail in the following with reference to the accompanying figures.

FIGS. 11a-d are a diagram for explaining the principle of the basic edge detection;

FIGS. 12a-d are a diagram illustrating edge detection response when noise is present;

FIG. 13 is a diagram illustrating edge detection response in a two-dimensional pattern;

FIG. 14 is a diagram for explaining the principle of the pattern detection method of the present invention according to the response distance selection method in which the areas are restricted for the linear pattern;

FIGS. 15a-c are a diagram for explaining the principle of the pattern detection method of the present invention according to the response contrast ratio selection method; and FIG. 16 is a circuit diagram showing one example of a structure of the circuit for erasing the candidate pattern linked to the central pixel.

DETAILED DESCRIPTION OF THE PREFERRED EMBODIMENTS

Figure 1:
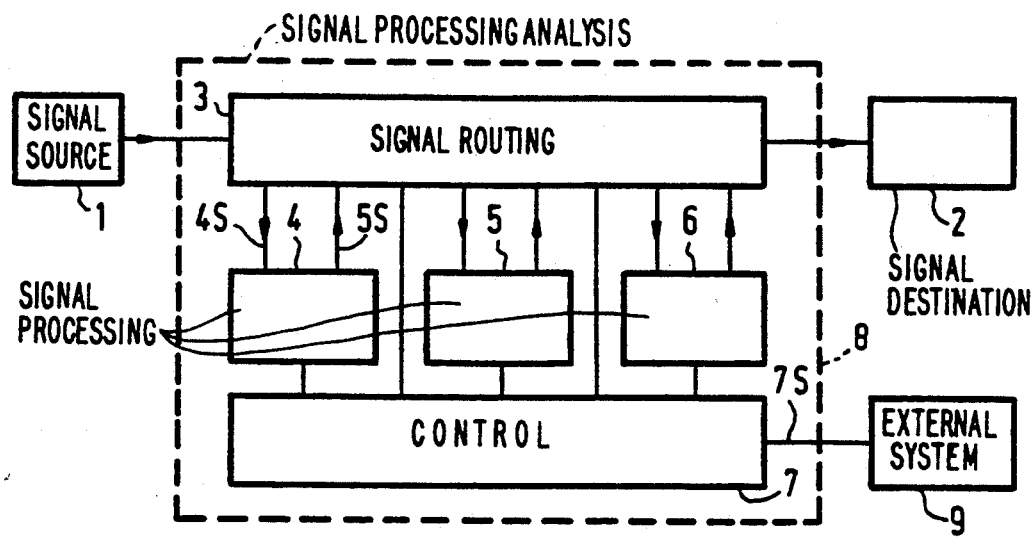
FIG. 1 is a block diagram showing one example of a signal processing/analysis system, in which the signal processing modules using the pattern detection device according to the present invention are incorporated.

FIG. 1 shows one example of a signal processing/analysis system 8 which may include a pattern detection device according to the present invention. In this signal processing/analysis system 8, there is a signal routing module 3, which is controlled by a control module 7. The signal routing module 3 makes the required connections with a signal source 1 such as a microphone, a TV camera or a CT scanner, a signal destination 2 such as a display or a signal storage device, and any number of signal processing modules (of which three are shown at 4, 5 and 6).

One of these signal processing modules 4, 5 and 6 might be used as a pattern detection device according to the present invention. Here is used the signal processing module 4 having an input signal 4S and an output signal 5S. Other processing modules might perform signal enhancement, which can be necessary before pattern detection is performed. Moreover, other processing modules might perform detection of the patterns on the basis of already detected patterns, or might store the signal for later use by other processing modules or by the control module 7.

For example, if the signal destination 2 is an image display, the present embodiment can aid in the automatic indication of certain objects in a medical image, to aid doctors in making a diagnosis. Other use of the signal processing or analysis system 8 can be an analysis of objects of interest in the field of view of a camera.

Through the control module 7, the coordinates, orientation, as well as information regarding the kind of the object can be sent as a signal 7S to a robot system. At this time, the robot system acts as an external system 9 so that the robot can pick parts up or remove faulty parts.

Figure 2:
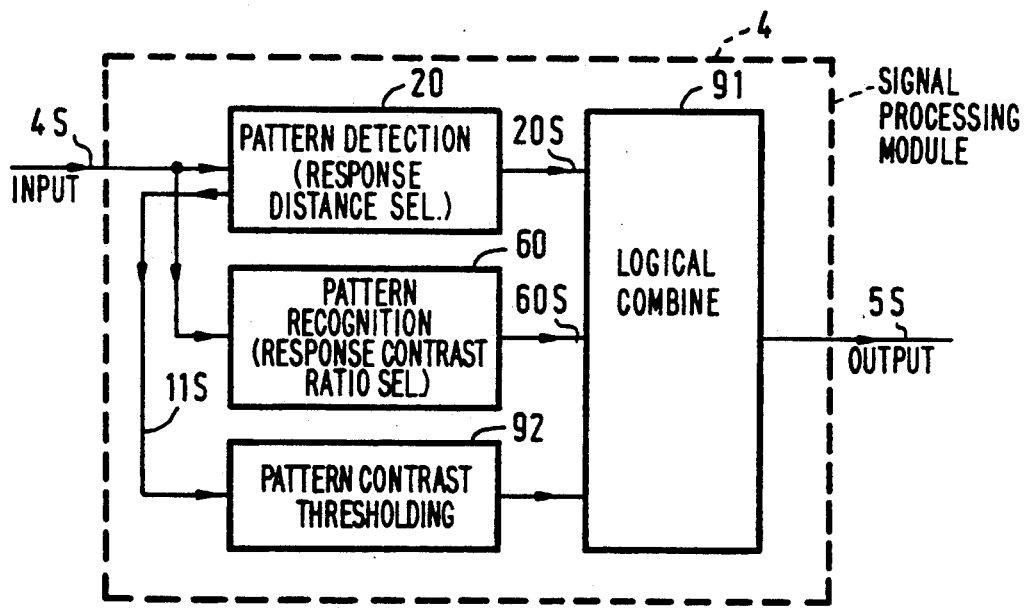
FIG. 2 is a block diagram showing one example of a signal processing module using the pattern detection device according to the present invention.

FIG. 2 shows one example of the structure of the signal processing module 4 using the pattern detection device of the present invention. The signal 4S is fed to a pattern detection module 20 using the response distance selection method and a pattern detection module 60 using a response contrast ratio selection method. Their binary output signals 20S and 60S are fed to a logical combine module 91. The input of a conventional pattern contrast thresholding module 92 is a pattern contrast signal 11S, but it might as well be a sharpened pattern contrast signal 13S, a pattern contrast signal 61S, a pattern contrast signal 62S, a sharpened pattern contrast signal 73S, or any other signal computed as a pattern contrast signal from the signal 4S, as will be described hereinafter. The pattern contrast threshold module 92 thresholds its input signal using any known method such as constant thresholding, thresholding with a pre-stored signal or hysteresis thresholding. The binary output signal of the conventional pattern contrast thresholding module 92 is also fed to the logical combine module 91. In this logical combine module 91, the output is formed by either selecting one of its three inputs, logically "anding" any of the three possible combinations of two of its three inputs, or logically "anding" all of its three inputs. The output is used as the binary signal 5S of the signal processing module 4.

If a certain input (20S or 60S or the output of the threshold module 92) of the logical combine module 91 is not used, then the module (20, 60 or 92) for processing this input need not be implemented. If only one input (20S or 60S) of the logical combine module 91 is used, this logical combine module 91 itself can be omitted as well.

Figure 3:
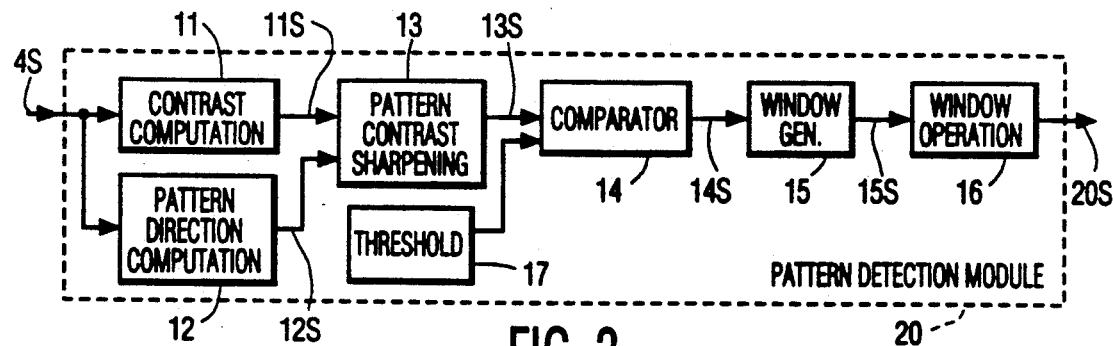
FIG. 3 is a block diagram showing one embodiment of a pattern detection device using the response distance selection method according to the present invention.

FIG. 3 shows one embodiment of the pattern detection method according to the present invention together with one example of the structure of the pattern detection module 20 based on the response distance selections. This pattern detection module 20 forms part of the signal processing module 4.

The input is the signal 4S, which is fed to a contrast computation module 11 to form a pattern contrast signal 11S. In case of a two-dimensional signal, edge detections can be an objective, for which many methods are known. In this example, the pattern contrast can be taken as the first derivative vector, which has the first partial derivative to x and y as its components.

The input signal 4S is also fed to a pattern direction computation module 12, which has a pattern direction signal 12S as its output. In the aforementioned example, the computed pattern direction can be taken as the direction of the first derivative vector. The pattern contrast signal 11S and the pattern direction signal 12S are fed to a pattern contrast sharpening module 13. The objective of the pattern contrast sharpening module 13 is to get a more precise location of a pattern, because the response of the pattern contrast computation module 11 is usually considerably broad. It should be noted that there exist contrast sharpening methods which do not need the output 12S of the pattern direction computation module 12, although not shown here, and that there also exist pattern contrast sharpening methods, which require the computation of other information of the input signal 4S, although also not shown here.

It should also be noted that the pattern contrast computation module 11 and the pattern direction computation module 12 may require the computation of the same partial results, in which case this computation can be shared by both modules, although not shown here as well.

The output of the pattern contrast sharpening module 13, i.e., the sharpened pattern contrast signal 13S is fed to a comparator module 14, which uses a threshold 17 to provide a candidate pattern signal 14S. If the sharpened pattern contrast signal 13S is at any one time larger than the threshold 17, the candidate pattern signal 14S is a logical "true", which means that a candidate pattern is present. Otherwise, the candidate pattern signal 14S is a logical "false", which means that no candidate pattern is present. The candidate pattern signal 14S is fed to a window generator module 15. For every element of the candidate pattern signal 14S, the window generator module 15 makes this element together with the elements in the window or region around it available as candidate pattern window signal 15S to be used by a binary window operation module 16.

The output of the binary window operation module 16 is a distance selected pattern signal 20S.

FIGS. 5a–5d show several examples of the candidate pattern window signal 15S for which the operation of the binary window operation module 16 will be explained.

Figure 5A:
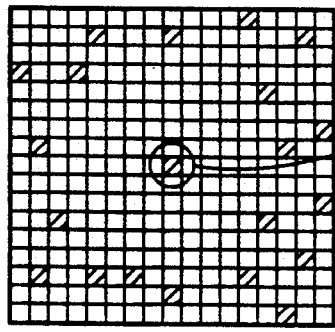
FIGS. 5a to 5f are diagrams for explaining the operation of the response distance selection method according to the present invention.
Figure 5B:
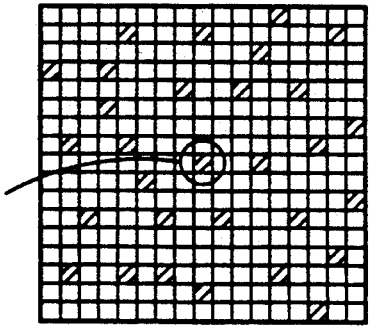

At first, a central element 41 of the candidate pattern window signal 15S will be examined. If it is not a candidate pattern, the output of the binary window operation module 16 will be a logical "false". If it is a candidate pattern, as the case in FIGS. 5a–5d, then it is decided, on the basis of the positions of the other candidate patterns and on their distance to the central candidate pattern, whether the central candidate pattern is a true pattern response, as in case the distance selected pattern signal 20S is made a logical "true", or a noise response, as in case the distance selected pattern signal 20S is made a logical "false". If one considers the patterns whose direction is always point-like, then very few or no other candidate patterns can be present around a true pattern. In the candidate pattern configuration of FIG. 5a, therefore, the central candidate pattern 41 is indeed a true pattern. The candidate pattern 41 of the candidate configuration of FIG. 5b is not the true pattern but the noise response.

The structure of the binary window operation module 16 for performing the "true" or "false" decision with the response distance selections corresponding to the point-like pattern can be exemplified in the following. Specifically, there may be provided around the candidate pattern 41 a mask pattern for allowing passage of only the inside (excepting the centre) of a circle having a radius of a certain threshold distance, so that the mask pattern may be "anded" with the candidate pattern window signal 15S. Then, the result may be subjected to OR and NOR. Thus, if another candidate pattern is present in the circle of the mask pattern, the result of AND of any element is "1" whereas the result of OR is 1 so that the final result is 0.

Figure 5C:
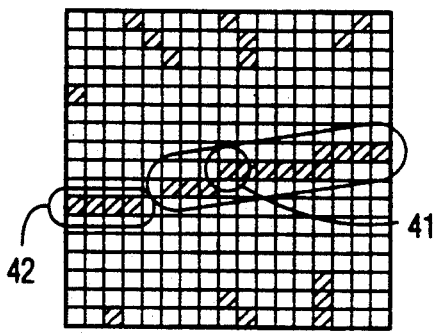
Figure 5D:
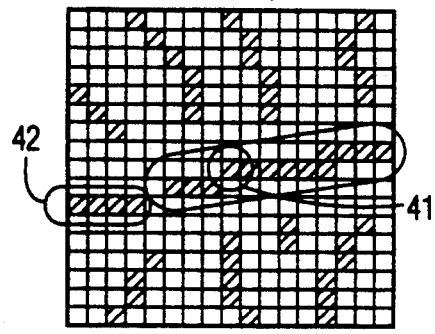
Figure 5E:
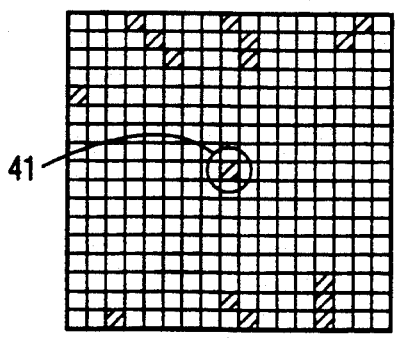
Figure 5F:
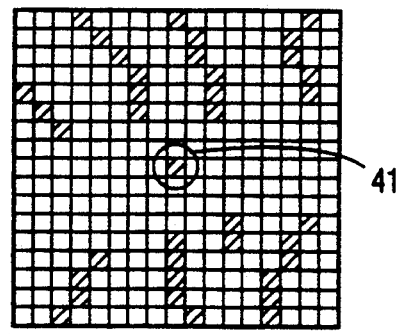

If elongated patterns are to be detected, such as edges in two or more dimensional signals, very few or no other candidate patterns can be present in the directions perpendicular to the direction in which the pattern is elongated. Therefore, one has to ignore those candidate patterns, which together form a pattern more or less linked to the central candidate pattern, because they are responses to the same pattern. These candidate patterns are denoted at 42 in FIGS. 5c and 5d. In FIGS. 5e and 5f, the other candidate patterns 42 linked to the candidate pattern 41 are removed. In order that the central candidate may be a true pattern, too many candidate patterns should not remain too close to the central candidate pattern after that removal. Thus, the remaining candidate pattern configuration of FIG. 5e might lead to the conclusion that the central candidate pattern is indeed a true pattern, and the remaining candidate configuration of FIG. 5f is not the true pattern but the noise response.

The binary window operation module 16 for the response selections corresponding to such linear pattern may be exemplified by adding a circuit for erasing the candidate 42 linked to the central candidate as the preprocessing module to the binary window operation module for the aforementioned point-like pattern.

One example of the structure of the erasing module is shown in FIG. 16. Characters 15S-1 appearing in FIG. 16 denote the signal of a central pixel of the window. Characters 15S-2 denote the individual signals of eight pixels around the centre, but they are represented by one. Characters 15S-3 denote the individual signals of sixteen pixels around the signal 15S-2. The signal arrangements are similar up to the outermost peripheral of the window. An AND element 91-2 is provided for each of the signals 15S-2 (although only one is shown), so that an output 91S-2 at 1 is obtained when both the central pixel signal and the surrounding pixel signals are at 1, namely, when the pixel is connected to the central candidate. At this time, the signal 15S-2 is suppressed to set the output 15S-2 to 0 by a NOT element and an AND element 93-2.

Next, for each signal 15S-3, an OR is taken by each OR element 92-3 among the signals 91S-2 corresponding to the individual adjoining pixels 1 to 3 at the centre, and an AND is taken with the signal 15S-3 by an element 91-3. Moreover, an AND with the signal 15S-3 is taken by the element 91-3 to indicate the linkage to any pixel in the inner periphery, that is linked to the central pixel. With the linkage, the output 93S-3 is suppressed by the NOT element and an AND element 93-3. If any of the adjoining pixels in the inner periphery fails to be linked to the central pixel, the output of the element 92-3 is 0,d and the signal 15S-3 gives as it is the output 93S-3. From now on, the modules corresponding to the pixels in the outer periphery likewise operate. As a result, from the candidate pattern mode shown in FIG. 5c or 5d, the pattern, from which the candidate linked to the central candidate 41 is erased, as shown in FIG. 5e or 5f, can be attained at an output 93S. If this output 93S is inputted to the binary window operation circuit for aforementioned point-like pattern, it can be decided whether or not the candidate pattern 41 is a true linear pattern.

Figure 4:
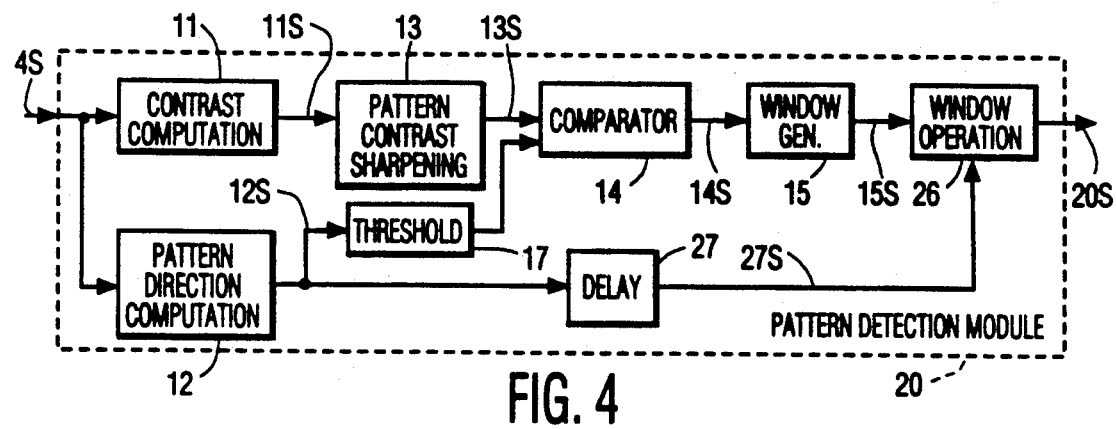
FIG. 4 is a block diagram showing one improved example of the pattern detection device shown in FIG. 3.

FIG. 4 shows one improved example of the pattern detection device according to the response distance selection method shown in FIG. 3. For selections in the detection of a predetermined pattern such as the linear pattern shown in FIG. 5c, it may be examined whether or not another candidate pattern is present close to the central candidate 41 only in the region in a certain orientation dependent upon the pattern orientation, which may be present in the position of the central candidate pattern.

As already explained, this orientation can be retrieved from the candidate pattern window signal 15S, but it can be easier to make use of the output of the pattern direction computation module 12. In order to do this, the output of the pattern direction computation module 12 is first delayed by a delay module 27, and is then sent as a delayed pattern direction signal 27S to a binary window operation module 26. The delay module 27 is necessary to compensate for processing delays in the modules 13, 14 and 15. The binary window operation module 26 performs a computation like the binary window operation module 16, but it only looks for the candidate patterns other than the central candidate pattern in sub-areas which are determined using the delayed pattern direction signal 27S. In other words, the processing may be accomplished only in the sector-shaped regions, as shown in FIG. 14. In FIGS. 5c and 5d, for example, the patterns 42 can be excluded based on the delayed pattern direction signal 27S. As a result, this improved example does not need the pre-processing circuit (of FIG. 16) for erasing the linkage candidate which has been described in connection with the embodiment of FIG. 3.

Figure 6:
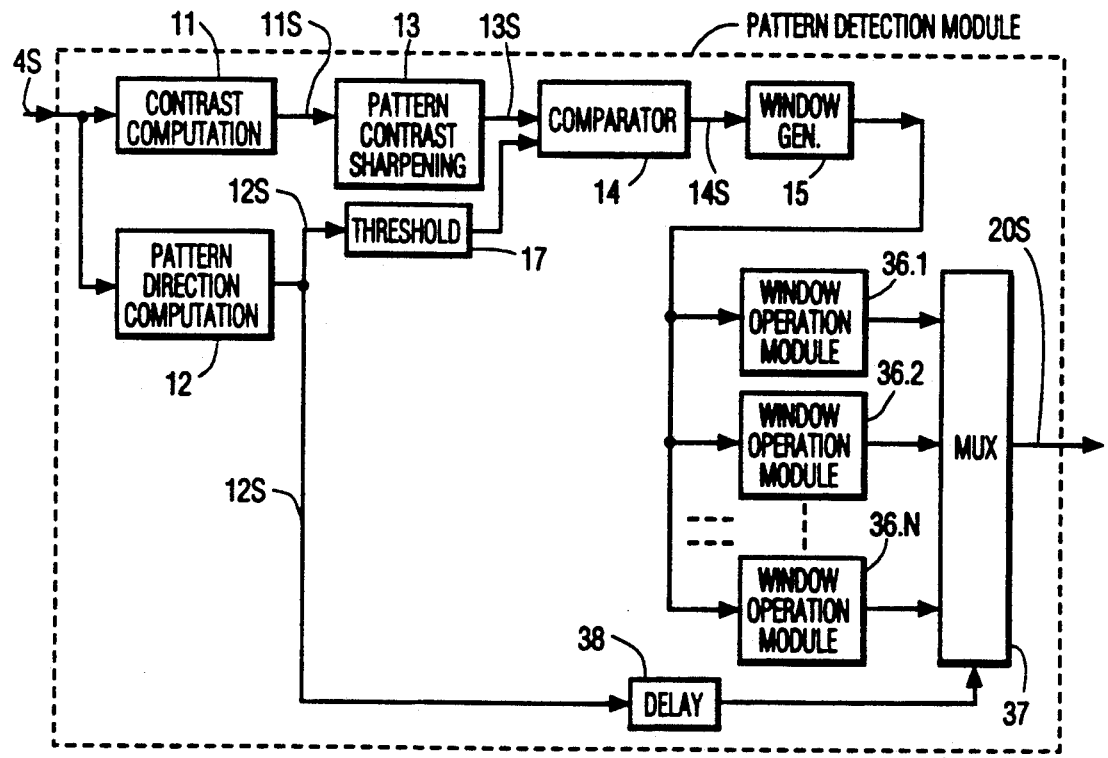
FIG. 6 is a block diagram showing a modified example of the pattern detection device shown in FIG. 5.

FIG. 6 shows a modification of the pattern detection device shown in FIG. 4. In the structure of FIG. 6, the binary window operation module 26 is replaced by several binary window operation modules 36.1 to 36.N, which check for the presence of the central candidate pattern as well for the presence of candidate patterns in areas (e.g., the sector areas of FIG. 14) located in a particular direction away from the central candidate pattern. Specifically, the output of the window generator module 15 is fed to any of the binary window operation modules 36.1 to 36.N. Thus, each module has a small scale. The output of the appropriate window operation modules 36.1 to 36.N is selected by a multiplexer 37. The selection by this multiplexer is controlled by the pattern direction signal 12S which is delayed by a delay module 38. A hardware implementation might be easier to do using the version of FIG. 6 than the version of FIG. 4.

Figure 7:
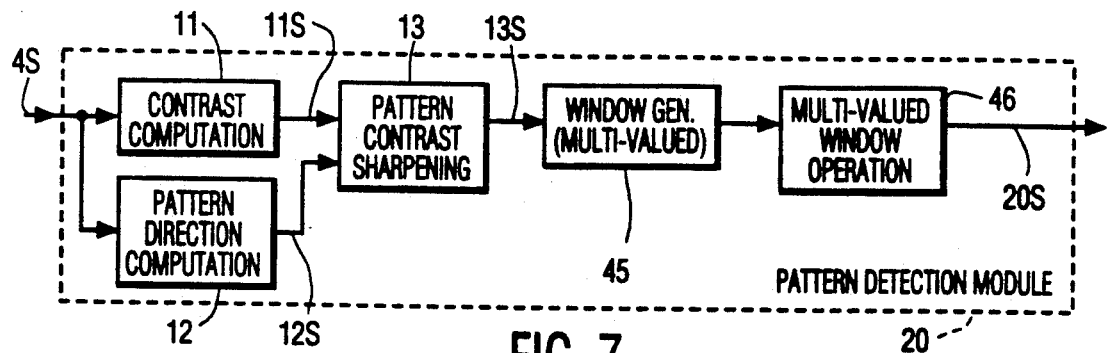
FIG. 7 is a block diagram showing one embodiment of the pattern detection device according to the response distance selection method making use of the contrast value of the candidate pattern.

In the individual embodiments shown in FIGS. 3, 4 and 6, the decisions in the modules 16, 26 and 36.1 to 36.N are based on the binary candidate patterns. FIG. 7, on the other hand, shows an embodiment which makes use of the contrast of the candidate patterns as well. Here, all the non-zero elements in the sharpened pattern contrast signal 13S are considered to be candidate patterns. The sharpened pattern contrast signal 13S is sent to a multi-valued window generator module 45, which performs the same function as the aforementioned window generator module 15, but then on the multi-valued elements instead of binary ones.

The output of the multi-valued window generator module 45 is fed to a multi-valued window operation module 46. In this multi-valued window operation module 46, not only the presence of the candidate patterns is taken into account, whereas the central candidate pattern is a true pattern or not. The higher the contrast of the central candidate pattern with respect to the contrast of the other candidate patterns, the higher the probability that it is a true pattern. On the other hand, the distance of the other candidate patterns to the central candidate pattern can be taken into account as well in the multi-valued window operation module 46. By requiring that the further away they are, the more contrast they should have with respect to the contrast of the central candidate pattern so as to influence the decision that the central candidate pattern is a true pattern or not.

Figure 8:
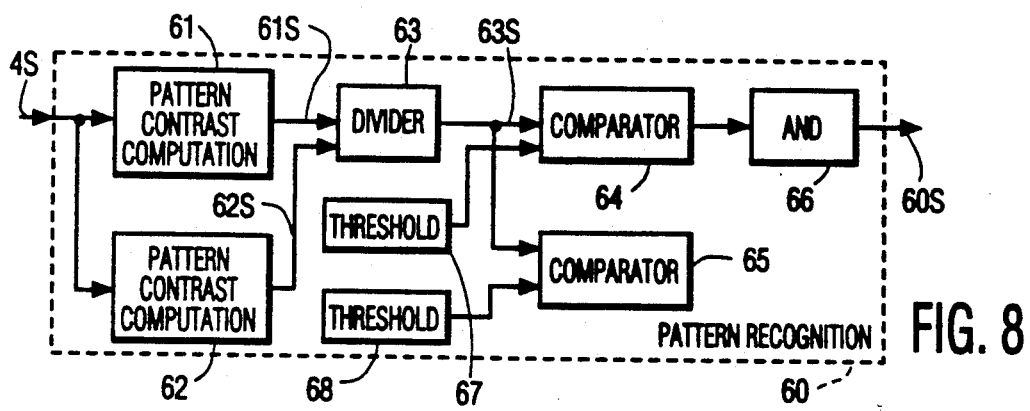
FIG. 8 is a block diagram showing one embodiment of the pattern detection device of the present invention according to the response contrast ratio selection method.

FIG. 8 shows another embodiment of the pattern recognition device 60 according to the present invention, according to the selection method based on the response contrast ratio. The input signal 4S is fed to a pattern contrast computation module 61 as well as a similar pattern contrast computation module 62. The difference between those two pattern contrast computation modules is that they are set to the same pattern but have a differently sized filter. One of the pattern contrast computation modules 61 and 62 might be the same as the pattern contrast computation module 11 shown in FIG. 3. The outputs of the modules 61 and 62 are the first pattern contrast signal 61S and the second pattern contrast signal 62S, respectively. The pattern contrast signals 61S and 62S are fed to a divider module 63, which divides the elements of the pattern contrast signal 61S by the corresponding elements of the pattern contrast signal 62S.

The divider module 63 generates a pattern contrast ratio signal 63S, which is fed to two comparator modules 64 and 65. These comparator modules 64 and 65 compare the pattern contrast ratio signal 63S with thresholds 67 and 68, respectively.

The outputs of the comparator modules 64 and 65 are logically anded by an AND module 66 to generate the pattern contrast ratio selected signal 60S, which is the final output of the pattern detection module 60. The objective of the combined modules 64, 65, 66, 67 and 68 is to test whether or not the values of the elements of the pattern contrast ratio signal 63S are within a range determined by the threshold 67 and 68.

It is needless to mention that if one of the thresholds 67 and 68 is selected such that the output of the corresponding comparator module is known to be always a logical "true", then that threshold, the corresponding comparator module and the "AND" module is taken as the pattern contrast ratio selected signal 60S.

A saving in the number of computations can be gained if the elements of the pattern contrast signal 61S are only computed if the corresponding elements of the pattern contrast signal 62S is non-zero.

Figure 9:
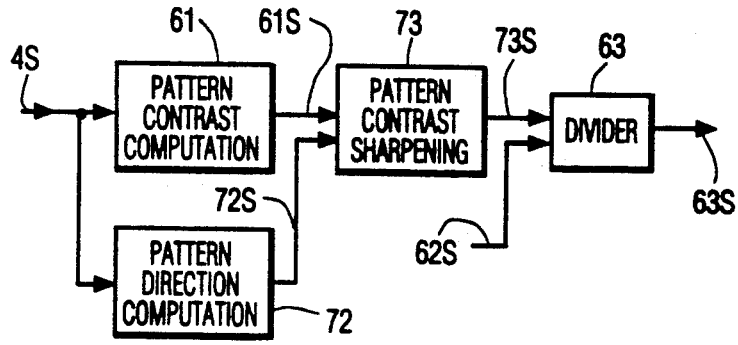
FIG. 9 is a block diagram showing an essential portion of one modified example of the pattern detection device shown in FIG. 8.

FIG. 9 shows one modification of the pattern recognition device according to the response contrast ratio selection method shown in FIG. 8. Here, the pattern contrast signal 61S is fed to a pattern contrast thinning module 73. This pattern contrast sharpening module 73 might need the output of a pattern direction computation module 72 which has the input signal 4S. But, it might also use other information computed from the signal 4S, although not shown, or it might only use the pattern contrast signal 61S, although not shown, just as is the case for the pattern contrast sharpening module 13. In fact, the modules 11 and 61 might be taken the same, as well as the modules 12 and 72, and as well as the modules 13 and 73. The output of the pattern contrast sharpening module 73 is the sharpened pattern contrast signal 73S, which is used as the input to the divider module 63 instead of the pattern contrast signal 61S. The remaining processing is the same as for the embodiment shown in FIG. 8 and is not shown in FIG. 9.

A saving in the number of computations can be gained if the elements of the pattern contrast signal 62S are only computed if the corresponding element of the sharpened pattern control signal 73S is non-zero.

It is needless to mention that it works just as well to interchange signals 61S and 62S, so that the output of the pattern contrast computation module 62 is sharpened instead of the output of the pattern contrast computation module 61. The advantage of the modification of FIG. 9 over that of FIG. 8 is that a more precise localization of the patterns is achieved.

Figure 10:
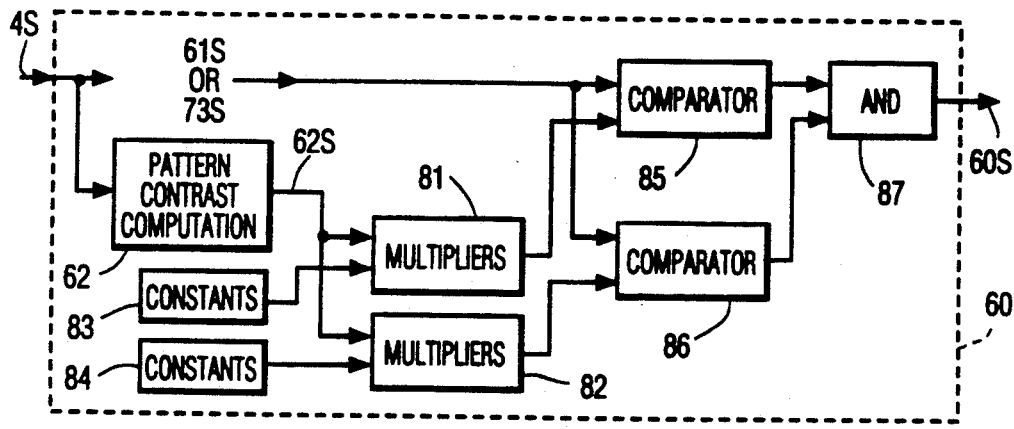
FIG. 10 is a block diagram showing another modification of the pattern detection device shown in FIG. 8 or FIG. 9 according to the response contrast ratio selection method with the pattern detection system shown in FIG. 9 being partially modified.

FIG. 10 shows a modified one of the embodiment shown in FIG. 8 or 9. The pattern contrast signal 62S of the second pattern contrast computation module 62 is fed to two multiplier modules 81 and 82. These multiplier modules 81 and 82 multiply the pattern contrast signal 62S with constants 83 and 84, respectively. The outputs of the multiplier modules 81 and 82 are fed to two comparator modules 85 and 86, respectively, so that they are compared with either the pattern contrast signal 61S of FIG. 8 or with the sharpened pattern contrast signal 73S of FIG. 9. The outputs of the comparator modules 85 and 86 are logically anded by an "AND" module 87 to generate the pattern contrast ratio selected signal 60S. The objective of the modules 81, 82, 83, 84, 85, 86 and 87 is to perform a mathematically similar operation as the modules 64, 65, 66, 67 and 68.

Needless to say when one of the constants 83 and 84 is zero, the corresponding multiplier module is not necessary. Instead, the input of the comparator module which would otherwise have been connected to the output of the unnecessary multiplier module can be connected directly to the zero-valued constant.

When one of the constants 83 and 84 is selected such that the output of the corresponding comparator 85 or 86 is known to be always a logical "true", then the comparator module, the multiplier module connected to one of its inputs, as well as the "AND" module 87 an not necessary. Instead, the output of the remaining comparator module is naturally taken as the pattern contrast ratio selected signal 60S.

It is just as good to interchange the pattern contrast signal 62S with either the pattern contrast signal 61S of FIG. 8 or with the sharpened pattern contrast signal 73S of FIG. 9.

Since the multiplier module is easier to implement in the hardware than the divider module, the embodiment of FIG. 10 can have an advantage over those of FIGS. 8 and 9.

As has been described hereinbefore, according to the present invention, the absolute value of the noise in the signal is unknown or different for the places, only the response to the true signal can be recognized and extracted.

We claim:

1. A method for distinguishing noise responses from true pattern responses comprising the steps of
   a) receiving an input signal;
   b) using first and second pattern detectors to generate first and second pattern contrast signals, the first and second pattern detectors having respective first and second edge extraction operators operating on input areas, the input areas having different input widths;
   c) comparing the first and second pattern contrast signals at a candidate location; and
   d) distinguishing the candidate location as containing a true pattern response based on a result of said comparing step.

2. The method of claim 1 comprising the steps of sharpening said first pattern contrast signal to form a sharpened pattern contrast signal; and
using the sharpened pattern contrast signal as the first pattern contrast signal in said comparing step.

3. The method of claim 1 comprising the step of computing said second pattern contrast signal for candidate locations having non-zero responses in the first pattern contrast signal.

4. The method of claim 1 wherein said comparing step comprises
generating a pattern ratio signal; and
comparing the ratio signal with a predetermined criterion.

5. The method of claim 1 wherein said comparing step comprises
comparing said first pattern contrast signal with values computed by multiplying said second pattern contrast signal by two different coefficients.

* * * * *